(12) United States Patent
Brown

(10) Patent No.: US 8,776,589 B1
(45) Date of Patent: Jul. 15, 2014

(54) TIRE PRESSURE SENSOR MOUNTING SYSTEM

(71) Applicant: Howard Brown, Rosedale Queens, NY (US)

(72) Inventor: Howard Brown, Rosedale Queens, NY (US)

( * ) Notice: Subject to any disclaimer, the term of this patent is extended or adjusted under 35 U.S.C. 154(b) by 21 days.

(21) Appl. No.: 13/768,141

(22) Filed: Feb. 15, 2013

(51) Int. Cl.
| | | |
|---|---|---|
| *G01M 17/02* | (2006.01) | |
| *B60C 23/00* | (2006.01) | |
| *B60C 23/04* | (2006.01) | |
| *G01M 17/03* | (2006.01) | |

(52) U.S. Cl.
CPC ............ *B60C 23/00* (2013.01); *B60C 23/0408* (2013.01); *B60C 23/0493* (2013.01); *G01M 17/02* (2013.01); *G01M 17/03* (2013.01)
USPC .......................................................... 73/146

(58) Field of Classification Search
None
See application file for complete search history.

(56) References Cited

U.S. PATENT DOCUMENTS

| | | | |
|---|---|---|---|
| 2,652,858 A | 9/1953 | Snyder | |
| 3,101,529 A | 8/1963 | Burrough | |
| 6,574,843 B1 | 6/2003 | Meadows | |
| 6,805,000 B1 * | 10/2004 | Sheikh-Bahaie | ............ 73/146.8 |
| 7,021,133 B1 | 4/2006 | Hsu | |
| 7,034,672 B2 * | 4/2006 | Dinello et al. | ................ 340/447 |
| 7,091,840 B2 * | 8/2006 | Ichinose | ...................... 340/447 |
| 7,281,421 B2 | 10/2007 | Yin et al. | |
| 7,656,281 B2 | 2/2010 | Zhou | |
| 8,096,175 B2 | 1/2012 | Uh et al. | |
| D653,567 S | 2/2012 | Yamada | |
| 2006/0243043 A1 * | 11/2006 | Breed | ............................ 73/146 |
| 2011/0000293 A1 * | 1/2011 | Luce | ........................... 73/146.8 |
| 2011/0043343 A1 * | 2/2011 | Shepler et al. | ................ 340/431 |
| 2011/0043354 A1 * | 2/2011 | Shepler et al. | ................ 340/447 |
| 2011/0296907 A1 * | 12/2011 | Luce | ........................... 73/146.8 |

* cited by examiner

*Primary Examiner* — Andre Allen

(57) ABSTRACT

The present invention features a tire pressure sensor mounting system to mount a tire pressure sensor on a wheel rim directly. The system comprises a singular mounting piece with a rim strap and at least two side straps to securing a tire pressure sensor. The side straps are disposed along the rim strap with extension direction perpendicular to the rim strap. Both the rim strap and side straps have lock means to securely lock the tire rim and tire pressure sensor respectively.

5 Claims, 5 Drawing Sheets

TIRE PRESSURE SENSOR MOUNTING SYSTEM

FIELD OF THE INVENTION

The present invention relates to a tire pressure sensor mounting system, and more particularly to a tire pressure sensor mounting system mounted on wheel rim directly.

BACKGROUND OF THE INVENTION

Many modern cars now come with built-in tire pressure sensors as part of a tire pressure monitoring system (TPMS) that allow all four tire pressures to be read simultaneously from inside the car. TPMS can be divided into direct and indirect systems. Direct TPMS employ pressure sensors on each tire, either internal or external. The sensors physically measure the tire pressure in each tire and report it to the vehicle's instrument cluster or a corresponding monitor, sometimes also the temperature inside the tire. These systems can identify under-inflation in any combination, of one tire or all four, simultaneously. Typically, the sensor is connected to a tire valve. When the valve breaks, sensor would normally have to be replaced, which is time-consuming due to reprogramming new sensor and cost unfriendly. Therefore, it is desirable for a system with the tire pressure sensor mounted on wheel rim directly without connections to the tire valve.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

SUMMARY OF THE INVENTION

The present invention features a tire pressure sensor mounting system. The system comprises a singular mounting piece with a rim strap and at least two side straps to securing a tire pressure sensor. The side straps are disposed along the rim strap with extension direction perpendicular to the rim strap. Both the rim strap and side straps have lock means to securely lock the tire rim and tire pressure sensor respectively.

DESCRIPTION OF PREFERRED EMBODIMENTS

Figure 1:
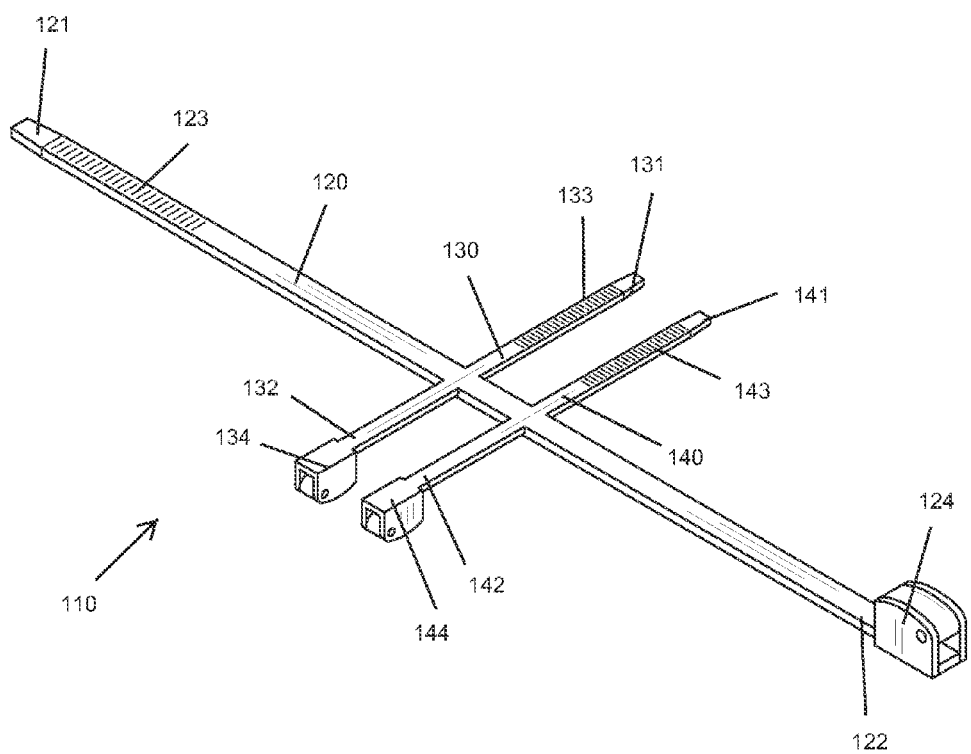
FIG. 1 shows an isometric view of a tire pressure sensor mounting piece.
Figure 2:
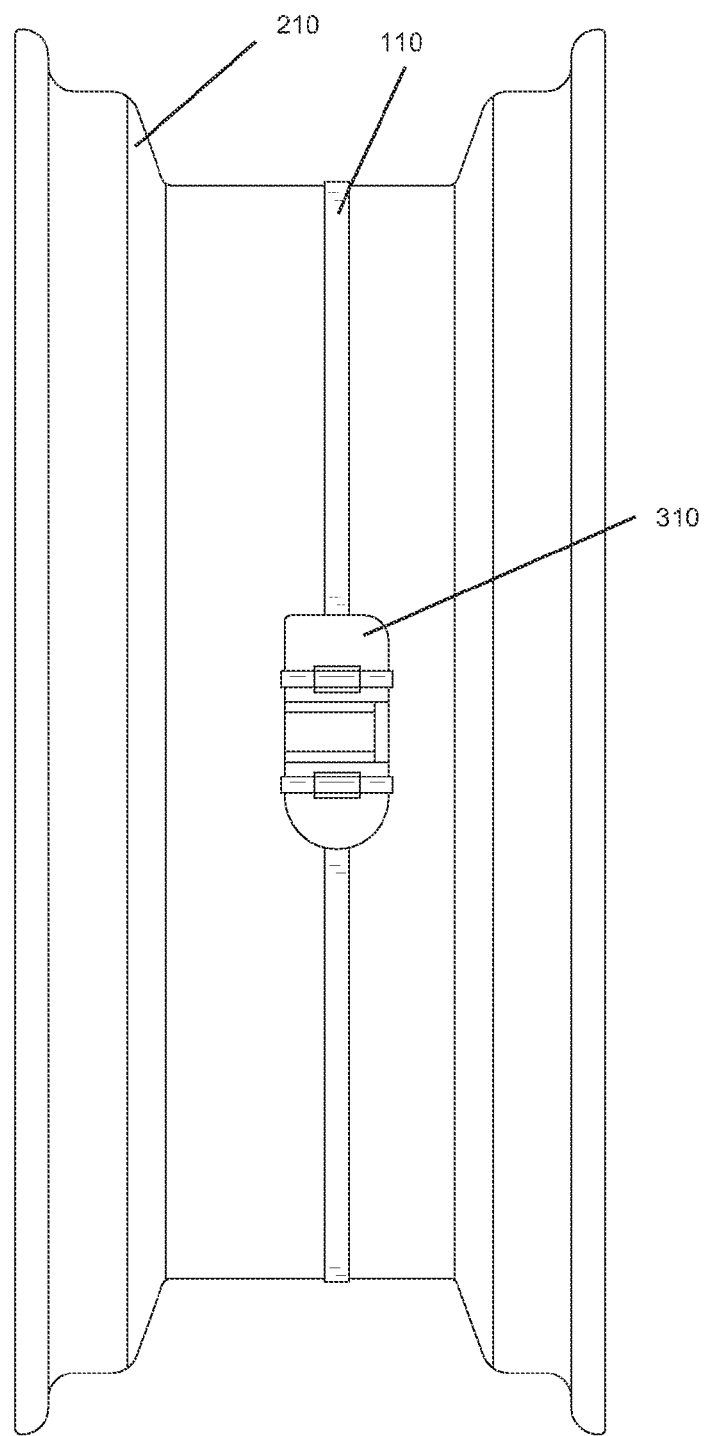
FIG. 2 shows a side view of a tire pressure sensor mounting system with the mounting piece mounted on a wheel rim directly.
Figure 3:
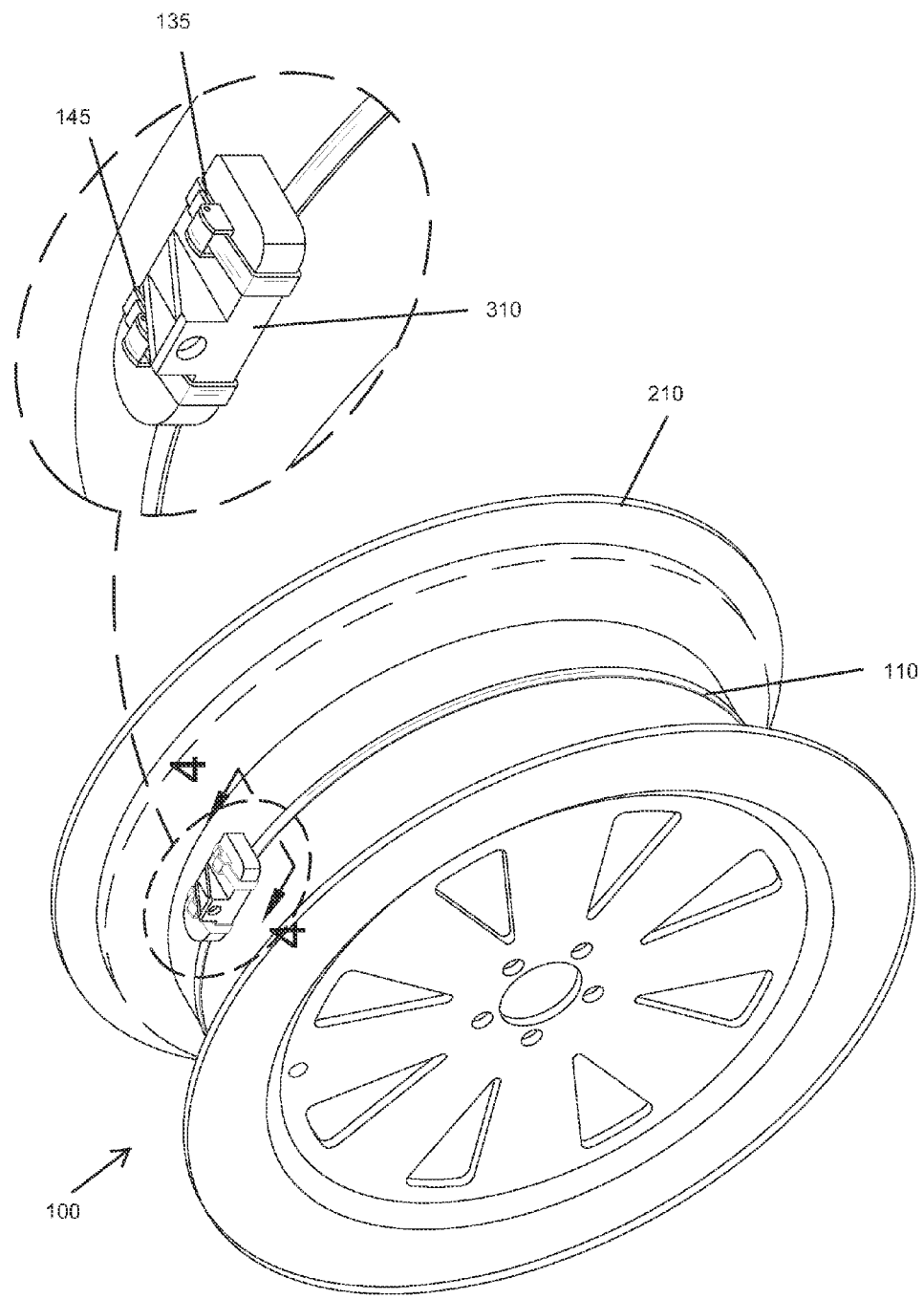
FIG. 3 shows an isometric view of a tire pressure sensor mounting system with the mounting piece mounted on a wheel rim directly.
Figure 4:
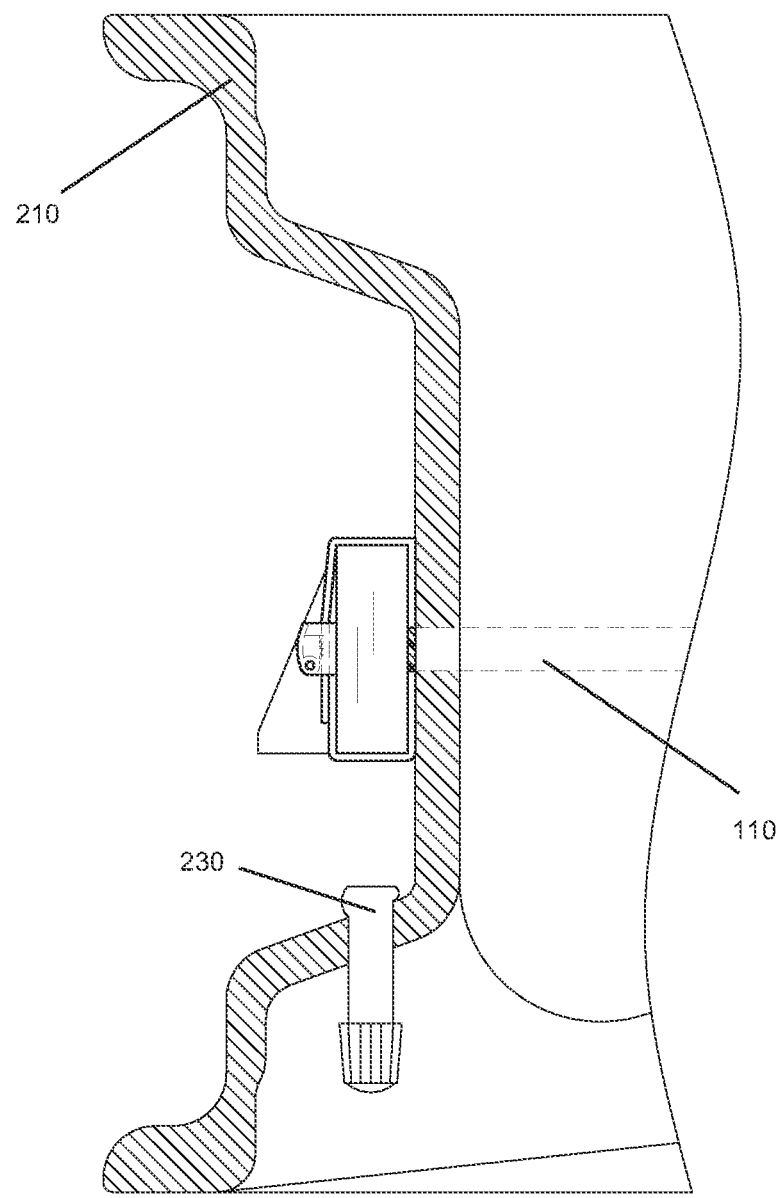
FIG. 4 shows a detailed view of a tire pressure sensor mounting system with the mounting piece mounted on a wheel rim directly.
Figure 5:
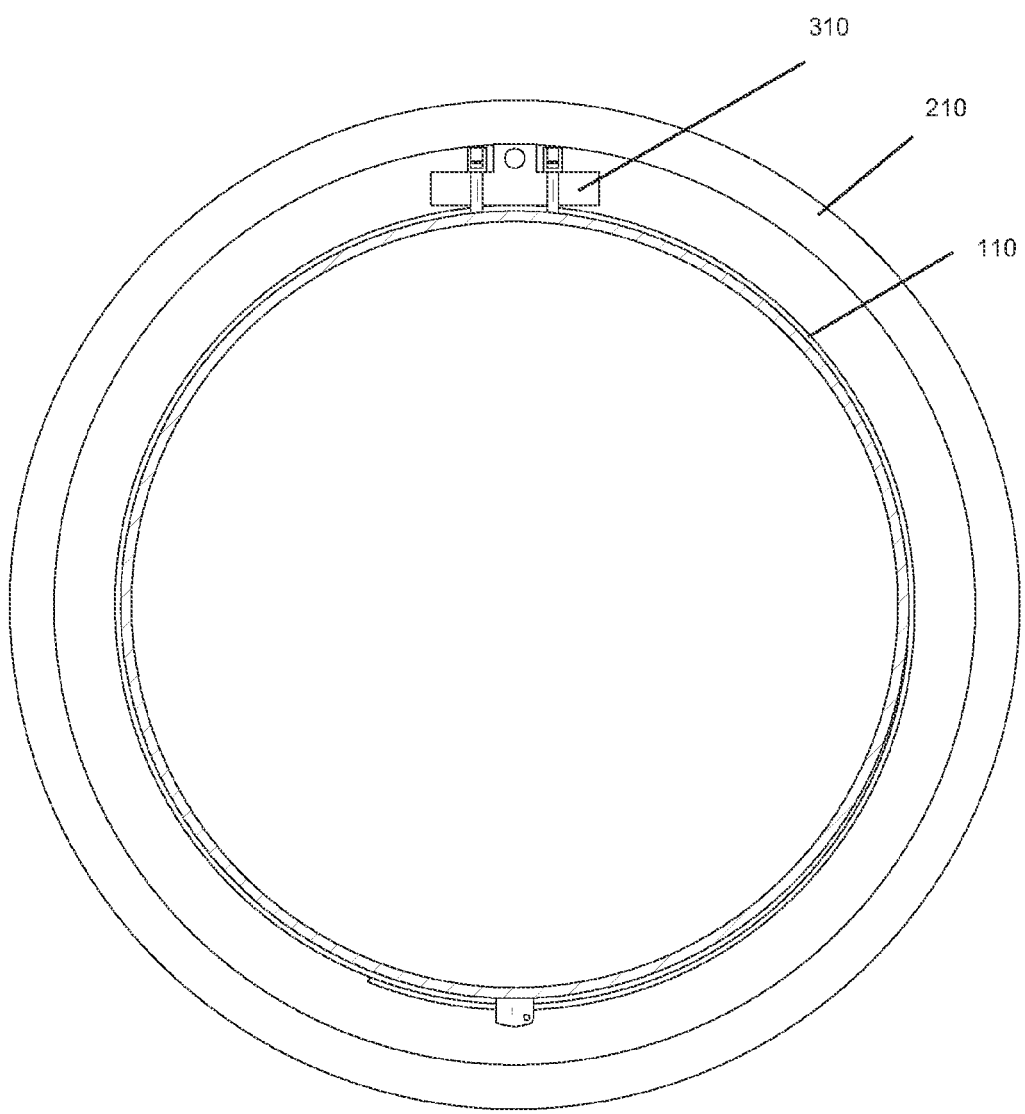
FIG. 5 shows a cross-sectional view of a tire pressure sensor mounting system with the mounting piece mounted on a wheel rim directly.

Following is a list of elements corresponding to a particular element referred to herein:

100 tire pressure sensor mounting system
110 mounting piece
120 rim strap
121 first end of the rim strap
122 second end of the rim strap
123 teeth of the rim strap
124 first lock means
130 first side strap
131 first end of the first side strap
132 second end of the first side strap
133 teeth of the first side strap
134 second lock means
140 second side strap
141 first end of the second side strap
142 second end of the second side strap
143 teeth of the second side strap
144 third lock means
210 wheel rim
220 valve
310 tire pressure sensor Referring now to FIG. 1-5, the present invention features a tire pressure sensor mounting system (100). The system comprises a wheel rim (210) with a valve (220) disposed on the wheel rim (210), a tire pressure sensor (310) without mechanical connection to the valve (220), and tire pressure sensor mounting piece (110).

The tire pressure sensor (310) are typically a direct tire pressure measurement sensor integrated power sources, microcontroller, A/D converter, radio frequency (RF) transmitter, and optionally a receiver.

The tire pressure sensor mounting piece (110) comprises a wheel rim strap (120) and at least two side strap (130 and 140) disposed on the wheel rim strap.

The wheel rim strap (120) has a first end (121) and a second end (122), wherein the rim strap (120) has a first lock means (124) disposed on the second end (122) to securely lock the first end (121) to tightly enclose the wheel rim (210).

The first side strap (130) has a first end (131) and a second end (132), wherein the first side strap (130) is disposed on the rim strap between the first end (121) and the second end (122) of the rim strap (120), wherein the first side strap (130) is perpendicular to the rim strap (120), wherein the first end (131) and second end (132) of the first strap (130) are on opposite sides of the rim strap (120), wherein the first side strap (120) has a second lock means (134) disposed on the second end (132) to form a first loop (135) and securely lock the first end (131).

The second side strap (140) has a first end (141) and a second end (142), wherein the second side strap (140) is disposed on the rim strap (120) and adjacent to the first side strap (130), wherein the second side strap (140) is perpendicular to the rim strap (120), wherein the first end (141) and second end (142) of the second strap (140) are on opposite sides of the rim strap (120), wherein the second side strap (140) has a third lock means (144) disposed on the second end (142) to form a second loop (145) and securely lock the first end (141).

The tire pressure sensor (310) is disposed on rim strap (120) and securely held by the first loop (135) of the first side strap (130) and by the second loop (145) of the second side strap (140).

In some embodiments, the first end (121) of the rim strap (120), the first end (131) of the first side strap (130) and the first end (141) of the second side strap (140) comprise triangular teeth that slope in one direction; wherein the first lock means (124), the second lock means (134) and the third lock means (144) are zip tie lock. Zip ties are well known to one of ordinary skill for secure locking applications.

In some embodiments, the first lock means (124), the second lock means (134) and the third lock means (144) are hook mechanism, button mechanism, hook-and-loop fastener or a combination thereof.

In some embodiments, the rim strap (120), the first side strap (130) and the second side strap (140) are made of plastics, nylon, metal or a combination thereof.

In some embodiments, at least part of the rim strap (120), the first side strap (130) or the second side strap (140) is elastic. Such arrangement would help the rim strap (120) further securely enclose the wheel rim and help the first side strap (130) and the second side strap (140) further securely enclose the tire pressure sensor.

In some embodiments, the wheel rim strap has a length enough to securely enclose a wheel rim ranging from 13 inch diameter up to 24 inch diameter. In some embodiments, at least part of the rim strap (120), the first side strap (130) and the second side strap (140) have the same width ranging from 0.5 inch to 5 inches. In some embodiments, at least part of the rim strap (120), the first side strap (130) or the second side strap (140) have different width.

As used herein, the term "about" refers to plus or minus 10% of the referenced number. For example, a 5" wide strap refers as a strap with width between 4.5" and 5.5".

The disclosures of the following U.S. Patents are incorporated in their entirety by reference herein: (1) U.S. Pat. No. 2,652,858; (2) U.S. Pat. No. 3,101,529; (3) U.S. Pat. No. 6,574,853; (4) U.S. Pat. No. 7,021,133; (5) U.S. Pat. No. 7,281,421; (6) U.S. Pat. No. 7,656,281; (7) U.S. Pat. No. 8,096,175 and (8) USD 653,576.

Various modifications of the invention, in addition to those described herein, will be apparent to those skilled in the art from the foregoing description. Such modifications are also intended to fall within the scope of the appended claims. Each reference cited in the present application is incorporated herein by reference in its entirety.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims. Reference numbers recited in the claims are exemplary and for ease of review by the patent office only, and are not limiting in any way.

The reference numbers recited in the below claims are solely for ease of examination of this patent application, and are exemplary, and are not intended in any way to limit the scope of the claims to the particular features having the corresponding reference numbers in the drawings.

What is claimed is:

1. A tire pressure sensor mounting system (100) to mount a tire pressure sensor (310) on a wheel rim (210) directly, wherein the system comprises:
    (a) a wheel rim (210) and a valve (220) disposed on the wheel rim (210);
    (b) a tire pressure sensor (310) without mechanical connection to the valve (220);
    (c) a tire pressure sensor mounting piece (110) comprising:
        (i) a rim strap (120) having a first end (121) and a second end (122), wherein the rim strap (120) has a first lock means (124) disposed on the second end (122) to securely lock the first end (121) to tightly enclose the wheel rim (210);
        (ii) a first side strap (130) having a first end (131) and a second end (132), wherein the first side strap (130) is disposed on the rim strap between the first end (121) and the second end (122) of the rim strap (120), wherein the first side strap (130) is perpendicular to the rim strap (120), wherein the first end (131) and second end (132) of the first strap (130) are on opposite sides of the rim strap (120), wherein the first side strap (120) has a second lock means (134) disposed on the second end (132) to form a first loop (135) and securely lock the first end (131);
        (iii) a second side strap (140) having a first end (141) and a second end (142), wherein the second side strap (140) is disposed on the rim strap (120) and adjacent to the first side strap (130), wherein the second side strap (140) is perpendicular to the rim strap (120), wherein the first end (141) and second end (142) of the second strap (140) are on opposite sides of the rim strap (120), wherein the second side strap (140) has a third lock means (144) disposed on the second end (142) to form a second loop (145) and securely lock the first end (141); and
    wherein the tire pressure sensor (310) is disposed on rim strap (120) and securely held by the first loop (135) of the first side strap (130) and by the second loop (145) of the second side strap (140).

2. The tire pressure sensor mounting system (100) of claim 1, wherein the first end (121) of the rim strap (120), the first end (131) of the first side strap (130) and the first end (141) of the second side strap (140) comprise triangular teeth that slope in one direction; wherein the first lock means (124), the second lock means (134) and the third lock means (144) are zip tie lock.

3. The tire pressure sensor mounting system (100) of claim 1, wherein the rim strap (120), the first side strap (130) and the second side strap (140) are made of plastics, nylon, metal or a combination thereof.

4. The tire pressure sensor mounting system (100) of claim 1, wherein at least part of the rim strap (120), the first side strap (130) or the second side strap (140) is elastic.

5. The tire pressure sensor mounting system (100) of claim 1, wherein the wheel rim (210) has a diameter ranging from 13 inch up to 24 inch diameter.

* * * * *